United States Patent [19]

Neuhaus et al.

[11] Patent Number: 5,025,039
[45] Date of Patent: Jun. 18, 1991

[54] PROCESS FOR THE PRODUCTION OF MOLDED POLYURETHANE FOAMS AND THE MOLDED FOAMS OBTAINED BY THIS PROCESS

[75] Inventors: Alfred Neuhaus, Leverkusen; Otto Ganster, Odenthal; Richard Kopp, Cologne, all of Fed. Rep. of Germany

[73] Assignee: Bayer Aktiengesellschaft, Leverkusen, Fed. Rep. of Germany

[21] Appl. No.: 440,627

[22] Filed: Nov. 22, 1989

[30] Foreign Application Priority Data

Dec. 3, 1988 [DE] Fed. Rep. of Germany ....... 3840817

[51] Int. Cl.$^5$ .............................................. C08G 18/14
[52] U.S. Cl. ...................................... 521/51; 521/117; 521/121; 521/128; 521/130; 521/157
[58] Field of Search ................ 521/51, 117, 121, 128, 521/130, 157

[56] References Cited

U.S. PATENT DOCUMENTS

| | | | |
|---|---|---|---|
| 4,070,310 | 1/1978 | Schneider et al. | 260/2.5 |
| 4,377,644 | 3/1983 | Kopp et al. | 521/94 |
| 4,417,002 | 11/1983 | Liessem | 521/157 |
| 4,473,666 | 9/1984 | Casati et al. | 521/115 |
| 4,520,141 | 5/1985 | Kumasaka et al. | 521/126 |

FOREIGN PATENT DOCUMENTS 240715 10/1987 European Pat. Off. .

OTHER PUBLICATIONS

Polyurethane Handbook, Chemistry—Raw Materials—Processing—Application Properties, Dr. Günter Oertel, 1985, pp. 315–317.
The ICI Polyurethanes Book, 1987, George Woods, pp. 88–100.

*Primary Examiner*—Maurice J. Welsh
*Attorney, Agent, or Firm*—Joseph C. Gil; Thomas W. Roy

[57] ABSTRACT

The present invention is directed to a process for the production of molded polyurethane foams having a compact surface and a density of at least 250 kg/m$^3$ by the in-mold foaming of a reaction mixture containing a) a polyisocyanate component containing at least one aromatic polyisocyanate,
b) an isocyanate-reactive component containing at least one organic compound having at least two isocyanate-reactive groups and
c) a blowing agent at an isocyanate index of 75 to 1500, characterized in that organic carboxylic acids are used as blowing agents c), optionally in addition to other chemical or physical blowing agents.

The present invention is also directed to the molded polyurethane foams obtained by this process.

24 Claims, No Drawings

PROCESS FOR THE PRODUCTION OF MOLDED POLYURETHANE FOAMS AND THE MOLDED FOAMS OBTAINED BY THIS PROCESS

DETAILED DESCRIPTION OF THE INVENTION

1. Field of the Invention

This present invention is directed to a process for the production of molded polyurethane foams having a compact surface in which organic carboxylic acids are used as blowing agents and to the molded polyurethane foams obtained therefrom.

2. Description of the Prior Art

The production of molded polyurethane foams having a compact skin by foam molding is known. (Note, for example, DE-AS 1 196 864). It is carried out by the in-mold foaming of a reactive and foamable mixture of organic polyisocyanates, compounds containing isocyanate-reactive groups and the known auxiliaries and additives. The reactive mixture is introduced into the mold in a larger quantity than would be necessary to fill the mold by free foaming. By suitably selecting the starting components, especially with regard to molecular weight and functionality, it is possible to produce flexible, semi-rigid and rigid foams. The compact outer skin is obtained by introducing a foamable mixture into the mold in a larger quantity than would be necessary to fill the mold by free foaming and by using blowing agents such as chlorofluorocarbons which condense on the inner wall of the mold under the prevailing temperature and pressure conditions, so that the blowing reaction stops at the inner wall of the mold and a compact outer skin is formed.

In addition to physical blowing agents, water in the form of carbon dioxide (formed by the reaction between water and isocyanates) is also used as a chemical blowing agent in industrial polyurethane chemistry. Although free polyurethane foams of excellent quality can be produced with this chemical blowing agent, it is not possible to produce high quality molded foams having a compact skin (integral foams). This is due to the fact that carbon dioxide does not condense on the inner mold wall under typical conditions, so that the blowing reaction does not stop in the peripheral zone.

Other chemical or physical blowing agents, for example, nitrogen-releasing blowing agents such as azodicarbonamide and azo-bis-isobutyronitrile carbon dioxide-releasing blowing agents such as pyrocarbonic acid esters and anhydrides (U.S. Pat. No. 4,070,310); and blowing agents dissolved in the reaction components, particularly the component containing isocyanatereactive groups, such as air are basically attended by the same problem and are therefore unsuitable for the production of high quality integral foams.

However, it has now surprisingly been found that it is possible to produce high quality molded polyurethane foams having a compact or integral skin from known starting materials using organic carboxylic acids as the principal blowing agent, provided that the blowing effect is predominantly based on the release of the carbon dioxide formed in the spontaneous reaction between isocyanate and carboxyl groups.

Although special mixed carboxylic/carbamic anhydrides formed from carboxylic acids and aliphatic isocyanates are described in DE-OS 3 041 589 as blowing agents for the production of polyurethane foams, particularly integral foams, this process is not suitable for use on an industrial scale.

This is because the mixed anhydrides are intended, on the one hand, to be stable in storage at temperatures of up to about 60° C, even in solution, and, on the other hand, to develop their blowing effect at about 80° C with the release of carbon dioxide. Accordingly, the temperature at which carbon dioxide is released is in a very narrow range. In addition, only aliphatic isocyanates can be used to produce the mixed anhydrides. In contrast, the aromatic polyisocyanates generally used as polyisocyanate component are unsuitable for the production of the special blowing agents. Finally, to carry out this process, the mixed anhydrides first have to be prepared and isolated in a separate reaction and then mixed carefully with the polyol mixture. These are additional process steps which make the use of these compounds more expensive and complicated.

Ready-to-use polyols containing the blowing agents mentioned cannot be stored and safely transported because the risk of a dangerous build up of pressure cannot be ruled out in the event of overheating which can occasionally occur despite careful handling.

None of these disadvantages arises in accordance with the process of the present invention because the carboxylic acids used as blowing agent can be safely added to the isocyanatereactive component.

SUMMARY OF THE INVENTION

The present invention is directed to a process for the production of molded polyurethane foams having a compact surface and a density of at least 250 kg/m$^3$ by the in-mold foaming of a reaction mixture containing a) a polyisocyanate component containing at least one aromatic polyisocyanate,
b) an isocyanate-reactive component containing at least one organic compound having at least two isocyanate-reactive groups and
c) a blowing agent at an isocyanate index of 75 to 1500, characterized in that organic carboxylic acids are used as blowing agents c), optionally in addition to other chemical or physical blowing agents.

The present invention is also directed to the molded polyurethane foams obtained by this process.

DETAILED DESCRIPTION OF THE INVENTION

The polyisocyanate component a) may be any aromatic polyisocyanate having an NCO content of at least 20% by weight. Examples of such aromatic polyisocyanates include 2,4-diisocyanatotoluene and/or 2,6-diisocyanatotoluene or, preferably, the known polyisocyanates or polyisocyanate mixtures of the diphenyl methane series which may be obtained by the phosgenation of aniline/formaldehyde condensates and, optionally, purification of the phosgenation products by distillation. The polyisocyanates or polyisocyanate mixtures particularly suitable for the process according to the invention generally contain about 50 to 100% by weight of diisocyanatodiphenyl methane isomers; the remainder is based on higher homologs of these diisocyanates. The diisocyanates present in these mixtures are based on 4,4'-diisocyanatodiphenyl methane in admixture with up to about 60% by weight, based on the total quantity of diisocyanates, of 2,4'-diisocyanatodiphenyl methane and, optionally, small quantities of 2,2'-diisocyanatodiphenyl methane. Urethane-, carbodiimide- or allophanate-modified derivatives of these polyisocyanates may also be used as polyisocyanate component a).

Isocyanate-reactive component b) is based on at least one organic compound containing at least two isocyanate-reactive groups and is generally based on mixtures of several such compounds. The individual compounds of component b) are preferably the organic polyhydroxyl compounds which are known from polyurethane chemistry.

Suitable organic polyhydroxyl compounds include, in particular, polyhydroxy polyethers having a molecular weight of 400 to about 10,000, preferably about 1500 to 6000 which contain at least 2, preferably 2 to 6 hydroxyl groups per molecule. These polyhydroxy polyethers may be obtained in known manner by the alkoxylation of suitable starter molecules. Suitable starter molecules include water, propylene glycol, glycerol, trimethylol propane, sorbitol, cane sugar, amino alcohols (such as ethanolamine or diethanolamine), aliphatic amines (such as n-hexylamine or 1,6-diaminohexane) and mixtures of such starter molecules. Preferred alkoxylating agents are propylene oxide and, optionally, ethylene oxide which may be used in admixture with propylene oxide or added sequentially in separate reaction steps during the alkoxylation reaction.

It is also possible to use modification products of such polyether polyols, i.e., the graft polyethers based on the unmodified polyether polyols mentioned by way of example, and filler-containing polyether polyols wherein the fillers are based on polyisocyanate polyaddition products, e.g., polyhydrazocarbonamides.

Component b) may also be based on polyester polyols having a molecular weight of 400 to about 10,000, preferably about 1500 to 4000, which contain at least 2, preferably 2 to 6 hydroxyl groups per molecule. Suitable polyester polyols are the reaction products of excess quantities of polyhydric alcohols of the type already mentioned by way of example as starter molecules with polybasic acids such as succinic acid, adipic acid, phthalic acid, tetrahydrophthalic acid and mixtures of such acids.

Low molecular weight polyhydroxyl compounds having a molecular weight of 62 to 399 are also suitable as component b) or as a portion of component b) and include the low molecular weight hydroxyl group-containing chain extenders or crosslinking agents known from polyurethane chemistry. Examples include the alkane polyols mentioned as starter molecules for preparing the polyether polyols and also low molecular weight polyether polyols obtained by the alkoxylation of such starter molecules.

As already mentioned, component b) is preferably based on organic polyhydroxyl compounds or mixtures of organic polyhydroxyl compounds. Examples of these mixtures include both mixtures of relatively high molecular weight polyhydroxyl compounds with low molecular weight polyhydroxyl compounds and also mixtures of low molecular weight polyhydroxyl compounds.

A portion of isocyanate-reactive component b) may also be based on compounds containing amino groups. Such compounds include both aminopolyethers having a molecular weight of 400 to about 12,000, preferably about 2000 to 8000, which contain at least 2 aliphatically- and/or aromatically-bound primary and/or secondary, preferably primary, amino groups and also low molecular weight polyamines having a molecular weight of 60 to 399. The aminopolyethers include those of the type mentioned in EP-B 0 081 701 (U.S. Pat. No. 4,774,263, herein incorporated by reference), U.S. Pat. No. 3,654,370, U.S. Pat. No. 3,155,728, U.S. Pat. No. 3,236,895, U.S. Pat. No. 3,808,250, U.S. Pat. No. 3,975,428, U.S. Pat. No. 4,016,143, U.S. Pat. No. 3,865,791 and DE-OS 2 948 491. The low molecular weight polyamines include aliphatic polyamines such as ethylene diamine and 1,6-diaminohexane and, preferably, aromatic polyamines, particularly alkyl-substituted phenylene diamines, such as 1-methyl-3,5-diethyl-2,4-diaminobenzene, 1-methyl-3,5-diethyl2,6-diaminobenzene,4,6-dimethyl-2 - ethyl-1,3-diaminobenzene, 3,5,3',5'-tetraethyl-4,4'-diaminodiphenyl methane, 3,5,3',5'-tetraisopropyl-4,4'-diaminodiphenyl methane, 3,5-diethyl-3',5'-diisopropyl-4,4'-diaminodiphenylmethane and mixtures of such compounds.

According to the invention, organic carboxylic acids are used as the blowing agent c) optionally in combination with other chemical or physical blowing agents. Suitable carboxylic acids include, in particular, aliphatic carboxylic acids having a molecular weight of 46 to 500, preferably 60 to 300. Particular preference is given to aliphatic carboxylic acids which, in addition to a carboxyl group, contain at least one other isocyanate-reactive group selected from primary alcoholic hydroxyl groups, secondary alcoholic hydroxyl groups, mercapto groups, primary amino groups, secondary amino groups and carboxyl groups.

Accordingly, suitable carboxylic acids include simple monocarboxylic acids such as acetic acid, propionic acid, pivalic acid, cyclohexane carboxylic acid, dodecanoic acid, stearic acid, oleic acid and mixtures of such acids, and preferably aliphatic carboxylic acids such as lactic acid, glycolic acid, tartaric acid, 2-mercaptoacetic acid, 3-mercaptopropionic acid, 6-aminohexanoic acid, 6-methylaminohexanoic acid, succinic acid, adipic acid and hexahydrophthalic acid. Cycloaliphatic compounds are regarded as aliphatic compounds in the context of the present invention. Lactic acid is particularly preferred as the organic carboxylic acid.

Although it is possible in principle to use aromatic carboxylic acids, such as benzoic acid, 4-methyl benzoic acid or phthalic acid, they are less preferred due to their poor solubility in the reactive component b).

In the practical application of the process according to the invention, the organic carboxylic acids crucial to the invention mentioned by way of example may also be used in combination with small quantities of other chemical or physical blowing agents including water, gases physically dissolved in the starting components (such as air, carbon dioxide or nitrogen), pyrocarbonic acid esters, nitrogen-eliminating compounds, volatile hydrocarbons or halogenated hydrocarbons. However, apart from the often unavoidable use of water and stirred-in air, the use of these other blowing agents is not preferred. If they are present, these other blowing agents generally make up at most 50% by weight, preferably at most 25% by weight, of all the blowing agents present in the reaction mixture.

The use of water as a further blowing agent often cannot be avoided because the starting components, particularly component b), often contain traces of water and some of the carboxylic acids used are marketed as mixtures with water and are used as such. In general, the total quantity of water in the reaction mixture is at most 3 moles, preferably at most 1.5 moles, of water per mole of carboxyl groups present in the carboxylic acids.

It is particularly preferred to use aqueous lactic acid, i.e, a solution which contains about 80 to 99% by weight of lactic acid and about 1 to 20% by weight of water.

The total quantity of blowing agent is determined by the required density of the molded foam. In general, the weight of component c) makes up about 0.1 to 10% by weight, preferably about 0.4 to 4% by weight, of the total reaction mixture of components a), b) and c) and optional component d). The isocyanate-reactive groups present in component c) are included in the calculation of the isocyanate index.

The optional auxiliaries and additives d) include catalysts which accelerate the isocyanate polyaddition reaction, e.g., tertiary amines such as triethylene diamine, N,N-dimethyl benzyl amine and N,N-dimethyl cyclohexyl amine and organometallic compounds, particularly tin compounds, such as tin(II) octoate or dibutyl tin dilaurate. Trimerization catalysts may also be used in accordance with the present invention when it is intended to produce polyurethane foams containing isocyanurate groups. Examples of these catalysts include alkali acetates such as sodium or potassium acetate; alkali phenolates such as sodium phenolate or sodium trichlorophenolate; 2,4,6-tris-(dimethylaminomethyl)-phenol; and lead naphthenate, lead benzoate or lead octoate, Other optional auxiliaries and additives d) include foam stabilizers such as those based on polyether-modified polysiloxanes and also internal mold release agents such as those described in EP-B 0 081 701, U.S. Pat. No. 3,726,952, GB-PS 1,365,215, U.S. Pat. No. 4,098,731, U.S. Pat. No. 4,058,492, DE-OS 2,319,648, U.S. Pat. No. 4,033,912, U.S. Pat. No. 4,024,090, DE-OS 2,427,273 or U.S. Pat. No. 4,098,731.

The process according to the invention is generally carried out by initially mixing starting components b), c) and optionally d) with one another and then combining the resulting mixture with polyisocyanate component a). This second mixing step is carried out, for example, using stirred mixers or, preferably, using the high-pressure mixing units normally used for the production of polyurethane foams. The mold is filled immediately after preparation of the reaction mixture; the quantity of reaction mixture introduced into the mold is adapted to the required density of the moldings. In addition to this one-step process, the process according to the invention may also be carried out by. the semi-prepolymer process. In this case, the total quantity of polyisocyanate component a) is reacted with a portion of component b), for example at an NCO:OH equivalent ratio of at least 3:1 and preferably at least 8:1, to form an NCO semi-prepolymer which is then reacted with a mixture of the remainder of components b), c) and optionally d). The polyhydroxyl compounds b) used for the preparation of the NCO semi-prepolymers may be different from the polyhydroxyl compounds b) subsequently mixed with the NCO semiprepolymers.

In the process according to the invention, the quantitative ratios between the individual components are selected to provide an isocyanate index of about 75 to 1500, preferably about 80 to 150. By "isocyanate index" is meant the quotient of the number of isocyanate groups divided by the number of isocyanate-reactive groups multiplied by 100. Isocyanate indices far greater than 100 may be used when it is desired to produce isocyanurate-modified polyurethane foams using trimerization catalysts.

The density of the moldings is at least 250 kg/m$^3$, preferably about 400 to 800 kg/m$^3$.

In general, the temperature of the molds used is at least 30° C., preferably at least 50° C. If necessary, the inner walls of the molds may be coated before filling with external mold release agents known.

The process according to the invention provides for the production of high-quality polyurethane foam moldings having a compact, bubble-free surface in the absence of the chlorofluorocarbons previously used. The process according to the invention is particularly suitable for the production of semi-rigid to rigid integral foams having a compact skin which are widely used in the automotive and furniture industries.

The invention is further illustrated but is not intended to be limited by the following examples in which all parts and percentages are by weight unless otherwise specified.

EXAMPLES

Starting Materials

Component a)

A polyisocyanate mixture of the diphenyl methane series having an NCO content of 31% by weight and a content of isomeric diisocyanatodiphenyl methanes of 60% by weight, of which 55% by weight is 4,4'-diisocyanatodiphenyl methane and approximately 5% by weight is 2,4'-diisocyanatodiphenyl methane.

Polyol component b1)

The propoxylation product of trimethylol propane, OH value 860.

Polyol component b2)

The propoxylation product of trimethylol propane, OH value 42.

Additive dl (stabilizer)

A commercial polyether siloxane (Tegostab OS 50, a product of Goldschmidt AG, 4300 Essen 1)

Additive d2 (catalyst)

N,N-dimethyl cyclohexylamine

The polyol mixtures set forth in Table 1 are processed with the quantity of polyisocyanate component a) set forth in Table 1.

TABLE I

| Component | Example | | | |
|---|---|---|---|---|
| | 1 | 2 | 3 | 4 |
| b1 | 57 | 57 | 57 | 57 |
| b2 | 39 | 39 | 39 | 39 |
| d1 | 2 | 2 | 2 | 2 |
| d2 | 3 | 4 | 2 | 2 |
| Water | — | 0.3 | 0.84 | — |
| 2-Hydroxypropanoic acid | — | 2.7 | — | — |
| Propanoic acid | 3.5 | — | — | — |
| Monofluorotrichloro methane | — | — | — | 6 |
| a | 142 | 148 | 148 | 134 |
| NCO index | 110 | 110 | 110 | 110 |

(All figures represent parts by weight)

General Observation on the Examples

Sheet-form foam moldings having a density of 400 to 600 kg/$^3$ (cf Table 2) were prepared using the formulations shown in Table 1. The mold used was a 10×200×200 mm sheet mold. The inner walls were coated with a commercially available wax-based external mold release agent (Acmosil 180, a product of Acmos, D-2800 Bremen 1). Before processing, the polyol mixtures were charged with 10% by volume, based on atmospheric pressure, of finely dispersed air by brief stirring at high speed (5 minutes, 1000 rpm, propeller stirrer)

The reaction mixtures of the polyol mixtures and the polyisocyanate component a) were prepared using a standard stirred mixing unit. The density of the particular moldings was determined by the quantity of the particular reaction mixture introduced into the mold.

EXAMPLES

| | |
|---|---|
| 1 and 2 | Examples according to the invention using carboxylic acid or a carboxylic acid/water mixture as $CO_2$-forming blowing agent. |
| 3 | Comparison Example using water as $CO_2$-forming blowing agent. |
| 4 | Comparison Example using monofluorotrichloromethane as blowing agent (conventionally rigid integral foam). |

The surface hardness (Shore D) of the individual molded foams is shown in Table 2 below:

TABLE 2

| Density | Examples | | | |
|---|---|---|---|---|
| (ka/m3) | 1 | 2 | 3 | 4 |
| 400 | 60 | 55 | 50 | 60 |
| 500 | 68 | 66 | 57 | 69 |
| 600 | 74 | 72 | 66 | 75 |

At all densities, the surface hardness of Examples 1 and 2 according to the invention was distinctly higher than in Comparison Example 3 which did not contain carboxylic acid. It is virtually identical to the surface hardness of the integral foam produced using monofluorotrichloromethane as blowing agent (Comparison Example 4).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded polyurethane foam having a density of at least 250 kg/m$^3$ and a compact surface which comprises foaming inside a closed mold at an isocyanate index of about 75 to 1500 a reaction mixture comprising
   a) a polyisocyanate component comprising at least one aromatic polyisocyanate,
   b) an isocyanate-reactive component comprising at least one organic compound containing at least two isocyanate-reactive groups,
   c) a blowing agent comprising an organic carboxylic acid.

2. The process of claim 1 wherein said organic carboxylic acid comprises an aliphatic carboxylic acid having a molecular weight of 60 to 300.

3. The process of claim 1 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

4. The process of claim 2 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

5. The process of claim 1 wherein said organic carboxylic acid comprises lactic acid.

6. The process of claim 1 wherein said blowing agent comprises an aqueous solution containing about 80 to 99% by weight of lactic acid and about 1 to 20% by weight of water.

7. A process for the production of a molded polyurethane foam having a density of at least 250 kg/m$^3$ and a compact surface which comprises foaming inside a closed mold at an isocyanate index of about 80 to 150 a reaction mixture comprising
   a) a polyisocyanate component comprising at least one aromatic polyisocyanate,
   b) an isocyanate-reactive component comprising at least one organic compound containing at least two isocyanate-reactive groups,
   c) a blowing agent comprising an organic carboxylic acid.

8. The process of claim 7 wherein said organic carboxylic acid comprises an aliphatic carboxylic acid having a molecular weight of 60 to 300.

9. The process of claim 7 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

10. The process of claim 8 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

11. The process of claim 7 wherein said organic carboxylic acid comprises lactic acid.

12. The process of claim 7 wherein said blowing agent comprises an aqueous solution containing about 80 to 99% by weight of lactic acid and about 1 to 20% by weight of water.

13. A molded polyurethane foam having a density of at least 250 kg/m$^3$ and a compact surface which is prepared by a process which comprises foaming inside a closed mold at an isocyanate index of about 75 to 1500 a reaction mixture comprising
   a) a polyisocyanate component consisting essentially of one or more aromatic polyisocyanates,
   b) an isocyanate-reactive component comprising at least one organic compound containing at least two isocyanate-reactive groups,
   c) a blowing agent comprising an organic carboxylic acid.

14. The molded polyurethane foam of claim 13 wherein said organic carboxylic acid comprises an aliphatic carboxylic acid having a molecular weight of 60 to 300.

15. The molded polyurethane foam of claim 13 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

16. The molded polyurethane foam of claim 14 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

17. The molded polyurethane foam of claim 13 wherein said organic carboxylic acid comprises lactic acid.

18. The molded polyurethane foam of claim 13 wherein said blowing agent comprises an aqueous solution containing about 80 to 99% by weight of lactic acid and about 1 to 20% by weight of water.

19. A molded polyurethane foam having a density of at least 250 kg/m$^3$ and a compact surface which is prepared by a process which comprises foaming inside a closed mold at an isocyanate index of about 80 to 150 a reaction mixture comprising a) a polyisocyanate component consisting essentially of one or more aromatic polyisocyanates,
b) an isocyanate-reactive component comprising at least one organic compound containing at least two isocyanate-reactive groups,
c) a blowing agent comprising an organic carboxylic acid.

20. The molded polyurethane foam of claim 19 wherein said organic carboxylic acid comprises an aliphatic carboxylic acid having a molecular weight of 60 to 300.

21. The molded polyurethane foam of claim 19 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

22. The molded polyurethane foam of claim 20 wherein said organic carboxylic acid additionally contains at least one other isocyanate-reactive group selected from the group consisting of primary alcoholic hydroxyl groups, secondary alcoholic hydroxyl groups, mercapto groups, primary amino groups, secondary amino groups or carboxyl groups.

23. The molded polyurethane foam of claim 19 wherein said organic carboxylic acid comprises lactic acid.

24. The molded polyurethane foam of claim 19 wherein said blowing agent comprises an aqueous solution containing about 80 to 99% by weight of lactic acid and about 1 to 20% by weight of water.

* * * * *